Patented July 31, 1928.

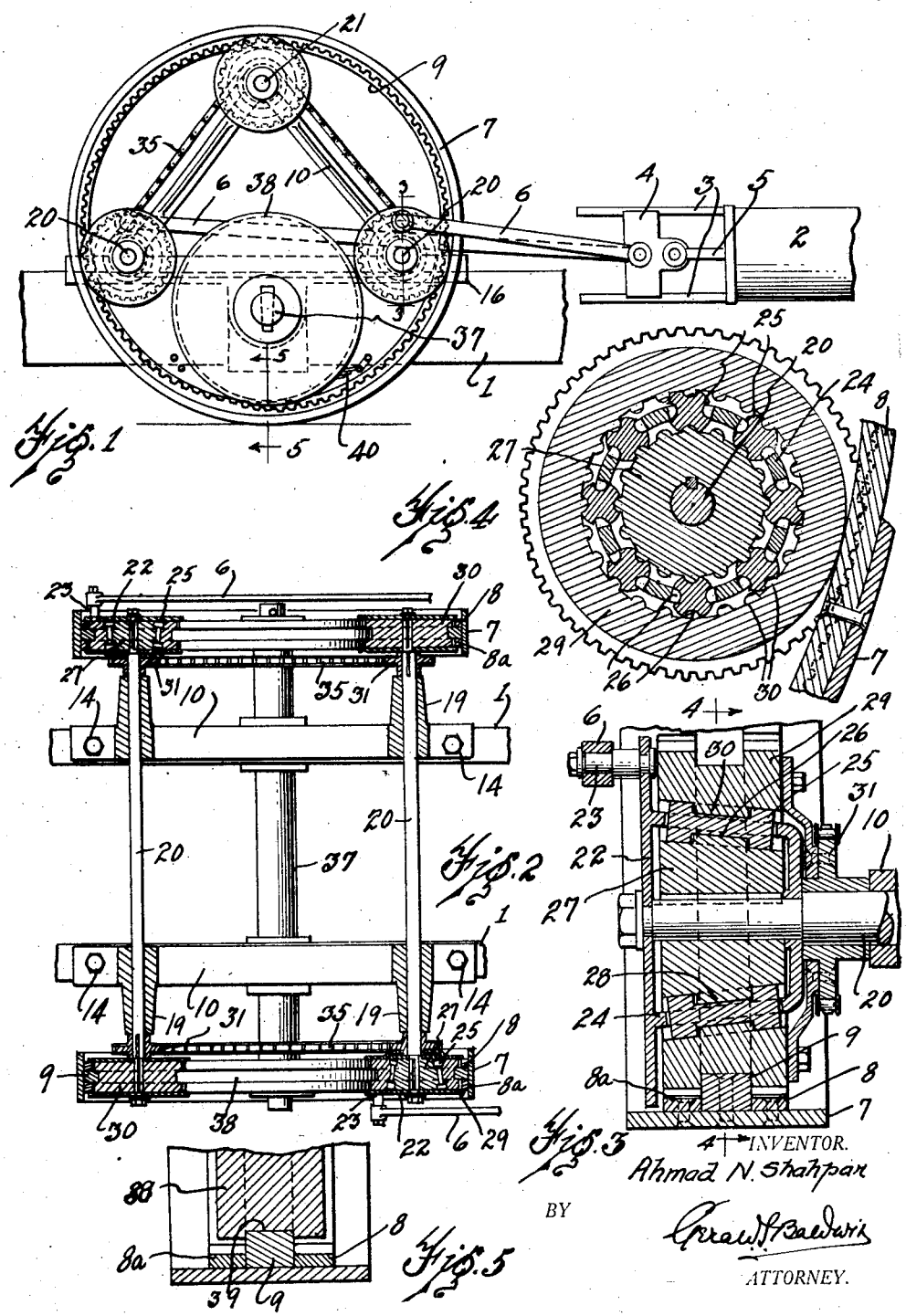

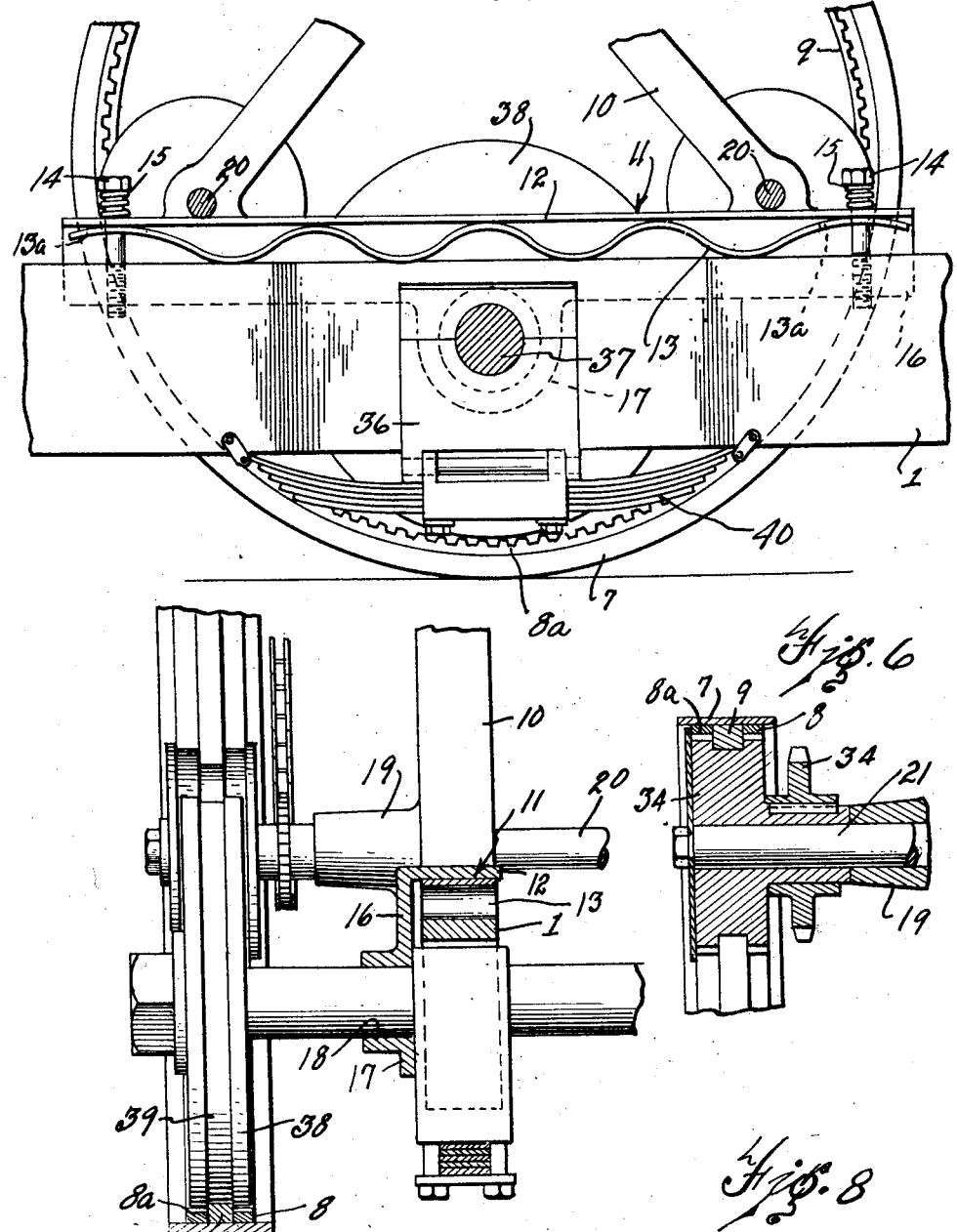

1,679,098

UNITED STATES PATENT OFFICE.

AHMAD N. SHAHPAR, OF HIGHLAND PARK, MICHIGAN.

DIFFERENTIAL DRIVING ARRANGEMENT.

Application filed July 1, 1927. Serial No. 202,785.

This invention relates to improvements in differential driving arrangements, and refers more particularly to an arrangement applicable to driving wheels having crank pins thereon each of which is driven from a separate cylinder.

It is an object of the invention to provide differential driving arrangements for vehicles intended to make sharp turns, and more particularly for vehicles intended to travel on roads whereon rails are provided for them.

Another object of the invention is to provide a differential driving arrangement wherein power from cylinders is transmitted through two separate differentials and two cross shafts through gearing to two annular driving wheels, and wherein the weight on the driving wheels is imparted to them from carrying wheels mounted on a separate axle.

A further object of the invention is to provide a differential driving arrangement wherein means are provided for maintaining a constant distance between the cross shafts and the carrying axle at all times so that the gears which cooperate with the annular driving wheels always remain in mesh with the latter.

Yet another object of the invention is to provide a differential driving arrangement wherein means are provided for equalizing the speed of rotation of both gears which drive one annular driving wheel, and a second similar means for equalizing the speed of rotation of the other two gears which drive the other annular driving wheel; though the speed of rotation of the two pairs of gears, and therefore of the two driving wheels may differ from one another.

With these and other objects in view which will become apparent as the specification proceeds, the invention is hereinafter more fully described with the aid of the accompanying drawings, in which:

Figure 1 illustrates a side elevation of the invention, and

Figure 2 shows a plan view.

Figure 3 is a section on the line 3—3 of Figure 1.

Figure 4 shows a section on the line 4—4 of Figure 3.

Figure 5 shows a section on the line 5—5 of Figure 1.

Figure 6 is a section on the line 6—6 of Figure 2, and

Figure 7 is a section on the line 7—7 of Figure 6.

Figure 8 is a detail.

Referring to the drawings, 1 designates conventional side frames, and 2 is a portion of an ordinary cylinder having slide bars 3 extending therefrom. 4 indicates a crosshead between the bars 3 to which the outer end of the usual piston rod 5 and one end of a connecting rod 6 is attached. This known arrangement is provided preferably on the outside of each of the frames 1.

The driving wheels consist of annular members 7 each of which have internal gears 8 and $8^a$ thereon. Between the gears 8 and $8^a$ internal circular bearing surfaces 9 are provided which are of less diameter than the said gears.

On each of the side frames 1 a substantially triangular support 10 is resiliently mounted. The bases 11 of these supports are usually of angle section; between the horizontal base portions 12 and the tops of the frames sinuous springs 13 are arranged, and the bases are held on the frames preferably by bolts 14 which pass through openings $13^a$ through the sinuous springs, have coil spring 15 between the undersides of their heads and the top of the horizontal base portions, and are in threaded engagement with holes in the upper side of the frames. Integral with the horizontal base portions 12 are downwardly extending vertical portions 16 which depend below the top of the frames on the outer sides of the latter, and substantially centrally of their length these portions 16 have downwardly extending aprons 17 thereon with openings 18 therethrough. In the ends of the supports adjacent to their bases bearings 19 are provided for cross shafts 20, and at the apexes of the supports outwardly extending stub shafts 21 are provided.

Loosely mounted on the outer ends of the transverse shafts 20 are discs 22, each of which has an outwardly projecting crank pin 23 thereon to receive the opposite end of its connecting rod 6. Integral with each disc is an inwardly projecting cage 24. Each cage carries a plurality of rollers 25 therein which are held in spaced relation to one another; these rollers have radial recesses 26 therein. On one and opposite ends of the shafts 20 driving plates 27 are keyed or otherwise secured. These plates have teeth or projections 28 on their peripheries which take into the roller recesses. The rollers also bear on the bore of the power gears 29, each of which is in mesh with one set of driving gears 8 and 8ª, so that their internal teeth or projections 30 also take into the roller recesses 26. In this connection it will be noted that the rollers are inclined at an angle to the discs 22 so as to facilitate the assembly of the rollers, power gears and driving plates. Moreover the rotation of the discs 22 and their cages 24 causes the rollers to turn about the axes of the shafts 20 and at the same time the rollers are free to turn about their own axes so that the speed of rotation imparted to the plates 27 and to the power gears 24 is variable.

On the shafts 20, at their ends remote from their crank pins, fixed gears 30 are secured, each of which meshes with one set of internal driving gears 8 and 8ª; and on the shafts 20 adjacent both to the fixed gears 30 and to the power gears 29 sprocket wheels 31 are arranged. It will be noted that the sprocket wheels adjacent to the power gears are secured to the latter and are free to rotate on the shafts 20, whereas the sprocket wheels adjacent to the fixed gears are so mounted on the shafts 20 as to rotate with them as the fixed gears do. On the stub shaft 21 idler gears 32 are freely mounted which also mesh with the gears 8 and 8ª. Integral with the idler gears 32 are sleeves 33 on which sprocket wheels 34 are secured so that the said sprocket wheels and idler gears rotate together. Around the three sprocket wheels 31, 34, and 31 on each support a driving chain 35 is arranged so as to insure uniform speed of rotation of each set of three gears 29, 30 and 32, though the speed of rotation of the two sets may vary. It will also be noted that each set of three gears 29, 30 and 32 are positioned substantially at 120 degrees to one another so that their relative positions tend to prevent radial movement of the annular driving wheels.

In the frames conventional axle boxes 36 are provided for carrying an axle 37. On the ends of the latter carrying wheels 38 are arranged. These wheels have annular grooves 39 in their peripheries which bear on the circular bearing surfaces 9 of the annular wheels. The side frames 1 are supported by springs 40 secured also to the axle boxes, and in order that the distance between the centre of the carrying axle and the driving shafts 20 shall remain constant at all times the axle 37 passes through the openings 18 in the aprons 17 integral with the bases of the supports 10.

While in the foregoing the preferred embodiment of the invention has been described and shown, it is understood that the construction is susceptible to such modifications as fall within the scope of the appended claims.

What I claim as my invention and desire to secure by Letters Patent is:

1. An arrangement of the character described comprising annular driving wheels having internal gears therein, cross shafts extending through both of said wheels, gears on each cross shaft meshing with said internal gears, a differential drive on each cross shaft so that the speed of rotation of the gears on the opposite ends of said shafts may vary, stub shafts, an idler gear on each stub shaft meshing with one of said internal gears, means for imparting power to said idler gears so that both the gears and the idler gear cooperating with each internal gear all impart an equal amount of power thereto, an axle, carrying wheels on said axle, internal annular flanges in said driving wheels against which said carrying wheels are adapted to turn, and separate means for operating each differential drive.

2. In an arrangement of the character described, the combination with side frames having axle boxes mounted therein, an axle supported by said boxes, and springs connecting said boxes with said side frames, of annular driving wheels having internal gears therein, cross shafts extending through both of said wheels, gears on each cross shaft meshing with said internal gears, a differential drive on each cross shaft so that the speed of rotation of the gears on the opposite ends of said shafts may vary, means for maintaining an equal speed of rotation of all gears that coact with each internal gear, carrying wheels on said axle, internal annular flanges in said driving wheels against which said carrying wheels are adapted to turn, separate means for operating each differential drive, and means for maintaining constant distances between the centres of the cross shafts and the axle at all times.

3. In an arrangement as described in claim 2, the combination wherein the means for maintaining constant distances between the centres of the cross shafts and the axle consists of supports on the side frames in which the cross shafts are mounted, depending aprons integral with said supports which take around said axle, and resilient supporting means on said frames for said supports.

4. In an arrangement of the character described, the combination of side frames having supports mounted thereon, cross shafts mounted in said supports, axle boxes in said frame, a carrying axle mounted in said boxes, annular driving wheels having internal gears, a disc revolvably mounted on each cross shaft, said discs being diagonally opposite to one another, crank pins in said discs, a cage on each disc, a plurality of circularly arranged rollers having radial recesses therein rotatably supported by each cage, a circular plate having projections on its periphery fixed on each shaft, said projections engaging said roller recesses, a power gear around each set of rollers having projections in its bore engaging said roller recesses, fixed gears on the opposite ends of said shafts, said power gears and said fixed gears meshing with said internal gears, means for maintaining equal speed of rotation of the power and fixed gears that mesh with each internal gear, carrying wheels on said axle, and internal annular flanges in said driving wheels against which said carrying wheels are adapted to rotate.

5. In an arrangement of the character described, the combination of side frames having supports therein, cross shafts mounted in said supports, annular driving wheels having internal gears thereon, gears on each cross shaft meshing with said internal gears, a differential drive on each cross shaft, separate means for operating each differential drive, a carrying axle by which said side frames are supported, carrying wheels on said axle, internal annular flanges in said driving wheels against which said carrying wheels are adapted to rotate, a stub shaft on each support, idler gears on said stub shafts meshing with said internal gears, and means for turning said idler gears and for equalizing the speed of rotation of all the gears that coact with each internal gear.

AHMAD N. SHAHPAR.